(12) United States Patent
Shinmura et al.

(10) Patent No.: US 7,635,963 B2
(45) Date of Patent: Dec. 22, 2009

(54) DUAL MOTOR DRIVE SYSTEM, CONTROL DEVICE FOR THE SAME, AND MOTOR TO BE USED IN THE SAME

(75) Inventors: Koichi Shinmura, Saitama (JP); Sadachika Tsuzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 220 days.

(21) Appl. No.: 11/882,942

(22) Filed: Aug. 7, 2007

(65) Prior Publication Data
US 2008/0150455 A1 Jun. 26, 2008

(30) Foreign Application Priority Data
Aug. 7, 2006 (JP) .............................. 2006-214564

(51) Int. Cl.
*H02P 27/04* (2006.01)

(52) U.S. Cl. ........................... 318/802; 318/85; 318/800

(58) Field of Classification Search .................. 318/85, 318/802, 800, 806, 812, 814, 66, 803, 599, 318/701, 729
See application file for complete search history.

(56) References Cited

U.S. PATENT DOCUMENTS
2004/0232877 A1* 11/2004 Kawaji et al. ............... 318/802

FOREIGN PATENT DOCUMENTS
JP 2001-103717 4/2001
JP 2001-231227 8/2001

* cited by examiner

*Primary Examiner*—Karen Masih
(74) *Attorney, Agent, or Firm*—Squire, Sanders & Dempsey L.L.P.

(57) ABSTRACT

An inverter having M×N arms is connected to a first motor having N groups of M phase coils and a second motor having M groups of N phase coils. At least one of the first motor and the second motor has as many teeth as the number of phases of the motor multiplied by an integer, and the M×N coils of the motor are wound around the teeth by equal to or more than two coils for each of the teeth. Drive points of the M×N coils of the first motor are connected to output points of the corresponding arms of the inverter. Drive points of the N×M coils of the second motor are connected to output points of the arms of the inverter, so that each of the N phase windings in each of the M groups of the second motor is connected to each of the N drive points of the first motor, the N drive points having the same phase. A controller feeds M×N pulse width modulation control signals to the inverter for the first motor and the second motor in a time-division manner, so that the first and the second motors are driven individually with the single inverter.

16 Claims, 13 Drawing Sheets

FIG.3 DRIVING THE MOTOR M1 (DRIVE PERIOD A)

FIG.4 DRIVING THE MOTOR M2 (DRIVE PERIOD B)

DRIVING A MOTOR M1a

DUAL MOTOR DRIVE SYSTEM, CONTROL DEVICE FOR THE SAME, AND MOTOR TO BE USED IN THE SAME

CROSS-REFERENCE TO RELATED APPLICATION(S)

This application claims the foreign priority benefit under Title 35, United States Code, §119(a)-(d), of Japanese Patent Application No. 2006-214564, filed on Aug. 7, 2006 in the Japan Patent Office, the disclosure of which is herein incorporated by reference in its entirety.

BACKGROUND OF THE INVENTION

1. Field of the Invention

The present invention relates to a technology of a dual motor drive system, and more particularly to a dual motor drive system for driving two motors individually by a single inverter circuit.

2. Description of the Related Art

Generally, two synchronous motors need to be provided with individual inverters in order to drive the motors individually (by different phases and at different rotating speeds). The inverter is designed for its current capacity to have a maximum current (a maximum torque) flow through the motor to be driven. In a system having the synchronous motor, however, there are relatively few times when the motor generates a maximum torque during operation of the system. Usually, the motor requires the maximum torque during a certain period of time, and during the rest of the time the motor being driven requires a lower torque.

For example, a drive motor of an electric automobile requires a maximum torque when accelerating from a low speed and starting to move up on a steep gradient, but during the rest of the time the motor being driven requires less than the maximum torque. It is assumed that an inverter usage ratio is determined by (an amount of passed current×a time to pass the current)/(a maximum amount of current×a system operating time). Because a torque during the normal driving state is several to several dozen percents of a maximum torque, the inverter usage ratio usually is determined to be several to several dozen percents. Thus, although the inverter is designed to generate a maximum current corresponding to a maximum torque, the inverter generates the maximum current for a certain period of time, and during the rest of the time the inverter is operated with a large amount of current to spare.

An electric automobile is equipped with various motors for accessories such as an air conditioner and a power steering, as well as the drive motor. In a system having a plurality of synchronous motors, each of the synchronous motors needs to be provided with an inverter used for itself, although the inverter has low usage ratio, thereby causing problems of cost and space for mounting the inverters.

There have been known techniques for driving two motors by a single inverter. For example, Japanese Laid-open Patent Application No. 2001-103717 (paragraphs [0033, 0034], FIG. 2) discloses combined motors having plural rotors. Each of the combined motors has a stator coil and a rotor separately (the combined motors may be incorporated in one, or arranged separately). In the combined motors, the same magnetic poles of the two stator coils are connected to each other in parallel, and combined currents pass through the coils from a single inverter. Thereby, each of the two rotors is driven individually at any rotating speed.

With the above-described configuration, however, because the two coils are connected to each other in parallel, there may be a problem that a current component of one of the coils passes through the other coil and more ineffectual current is generated through the coils, thereby increasing copper loss or the like.

In consideration of the problem as described above, Japanese Laid-open Patent Application No. 2001-231227 has proposed combined motors for reducing the generation of an ineffectual current generated when the same magnetic poles of two stator coils are connected to each other in parallel, respectively, so as to improve the driving efficiency of the motors.

However, the technique disclosed in the above-described Japanese Laid-open Patent Application No. 2001-103717 has the serious problem of the ineffective current generated when the combined currents flow into the two stator coils. Also, in the above-described Japanese Laid-open Patent Application No. 2001-231227, the three-phase motor includes a motor having a rotor with equal to or more than three pairs of magnetic poles, and a three-phase motor having less than or equal to two pairs of magnetic poles may not be applied.

SUMMARY OF THE INVENTION

The present invention is made to solve the problem as described above, and the object of the present invention is to provide a dual motor drive system for driving two motors, including a motor having less than or equal to two pairs of magnetic poles, individually with a single inverter circuit, a control device for the dual motor drive system, and a motor to be used in the dual motor drive system.

According to one aspect of the present invention, there is provided a dual motor drive system comprising a first motor having N groups of M phase coils, the coils having M×N drive points; a second motor having M groups of N phase coils, the coils having N×M drive points; an inverter having M×N arms; and a control unit (also referred to as a controller) that controls the first motor and the second motor through the inverter. In the system, at least one of the first motor and the second motor has as many teeth as the number of phases of the motor multiplied by an integer, and the M×N coils of the motor are wound around the teeth by equal to or more than two coils for each of the teeth. The M×N drive points of the first motor are connected to output points of the corresponding arms of the inverter. The N×M drive points of the second motor are connected to output points of the arms of the inverter, so that n phase coil (n=1, 2, ..., N) in each of the M groups of the second motor is connected to each of the N drive points of the first motor, the N drive points having the same phase. The control unit feeds M×N pulse width modulation control signals to the inverter during a drive period of the first motor so that driving patterns of the phase coils are identical among all the N groups of the first motor, and the control unit feeds N×M pulse width modulation control signals to the inverter during a drive period of the second motor so that driving patterns of the phase coils are identical among all the M groups of the second motor.

With the above-described dual motor drive system, it is possible to drive the two motors individually (at different rotating speeds and torques), because one of the two motors is driven without exerting any effect on a current of the other motor.

In the dual motor drive system, at least one of the first motor and the second motor may have less than or equal to two pairs of magnetic poles. Both the M and the N may be 3.

According to another aspect of the present invention, there is provided a control device for a dual motor drive system. The dual motor drive system includes a first motor having N groups of M phase coils, the coils having M×N drive points; a second motor having M groups of N phase coils, the coils having N×M drive points; and an inverter having M×N arms. At least one of the first motor and the second motor has as many teeth as the number of phases of the motor multiplied by an integer, and the M×N coils of the motor are wound around the teeth by equal to or more than two coils for each of the teeth. The M×N drive points of the first motor are connected to output points of the corresponding arms of the inverter. The N×M drive points of the second motor are connected to output points of the arms of the inverter, so that n phase coil (n=1, 2, . . . , N) in each of the M groups of the second motor is connected to each of the N drive points of the first motor, the N drive points having the same phase. The control device for the dual motor drive system for controlling the inverter comprises a unit (including a current value feedback control sections and a pulse width modulation pattern generation logic) for feeding M×N pulse width modulation control signals to the inverter during a drive period of the first motor so that driving patterns of the phase coils are identical among all the N groups of the first motor, and for feeding N×M pulse width modulation control signals to the inverter during a drive period of the second motor so that driving patterns of the phase coils are identical among all the M groups of the second motor.

With the control device for the dual motor drive system, it is possible to drive the two motors individually (at different desired rotating speeds and torques) because the inverter is controlled in such a way that one of the two motors is driven without passing a current through the other motor.

The unit for feeding the pulse width modulation control signal may comprise a unit that generates the M×N pulse width modulation control signals for the first motor based on a first command indicating a rotating speed and a torque each set for the first motor; and a unit that generates the N×M pulse width modulation control signals for the second motor based on a second command indicating a rotating speed and a torque each set for the second motor. A rotating speed and a torque are set individually for each of the first motor and the second motor.

The control device for the dual motor drive system may comprise a unit (also referred to as a motor torque setting section) that controls the pulse width modulation control signal of one of the first and the second motors, the one to which a lower priority is previously set, so as to prevent a total amount of currents of the first and the second motors from exceeding an allowable current of the inverter.

According to further another aspect of the present invention, there is provided a motor to be used in a dual motor drive system. The dual motor drive system includes a first motor having N groups of M phase coils, the coils having M×N drive points; a second motor having M groups of N phase coils, the coils having N×M drive points; an inverter having M ×N arms; and a control unit that controls the first motor and the second motor through the inverter. The M×N drive points of the first motor are connected to output points of the corresponding arms of the inverter. The N×M drive points of the second motor are connected to output points of the arms of the inverter, so that n phase coil (n=1,2, . . . , N) in each of the M groups of the second motor is connected to each of the N drive points of the first motor, the N drive points having the same phase. The control unit feeds M×N pulse width modulation control signals to the inverter during a drive period of the first motor in accordance with a request from outside for the first motor so that driving patterns of the phase coils are identical among all the N groups of the first motor, and the control unit feeds N×M pulse width modulation control signals to the inverter during a drive period of the second motor in accordance with a request from outside for the second motor so that driving patterns of the phase coils are identical among all the M groups of the second motor. The motor to be used in the dual motor drive system as the second motor includes as many teeth as the N multiplied by an integer, and the M×N phase coils are wound around the teeth by equal to or more than two coils for each of the teeth.

By using the above-described motor in the dual motor drive system, it is possible to drive the two motors individually (at different rotating speeds and torques), because one of the two motors is driven without passing a current through the other motor.

The motor to be used in the dual motor drive system may have less than or equal to two pairs of magnetic poles. Both the M and the N may be 3.

The motor to be used in the dual motor drive system may include a rotor having a pair of magnetic poles, and three teeth that produce a magnetic field for the rotor. Each of the teeth has three coils wound therearound.

The motor to be used in the dual motor drive system may include a rotor having two pairs of magnetic poles, six teeth that produce a magnetic field for the rotor. Each of the teeth has three coils wound therearound. Two teeth each having the three coils may be connected in parallel and arranged to be opposed to each other, and the individual coil of the opposing teeth is connected in parallel.

With the present invention, the single inverter is connected to the two motors each having the same number of coils as the number of phases of the inverter, and one of the two motors is driven without passing a current through the other motor. Thereby, it is possible to drive the two motors individually (at different rotating speeds and torques).

BRIEF DESCRIPTION OF THE DRAWINGS

The object and features of the present invention will become more readily apparent from the following detailed description taken in conjunction with the accompanying drawings in which:

FIG. 10A shows a configuration of the motor, and FIG. 10B schematically shows the configuration of the motor;

DETAILED DESCRIPTION OF THE PREFERRED EMBODIMENT

Figure 1:
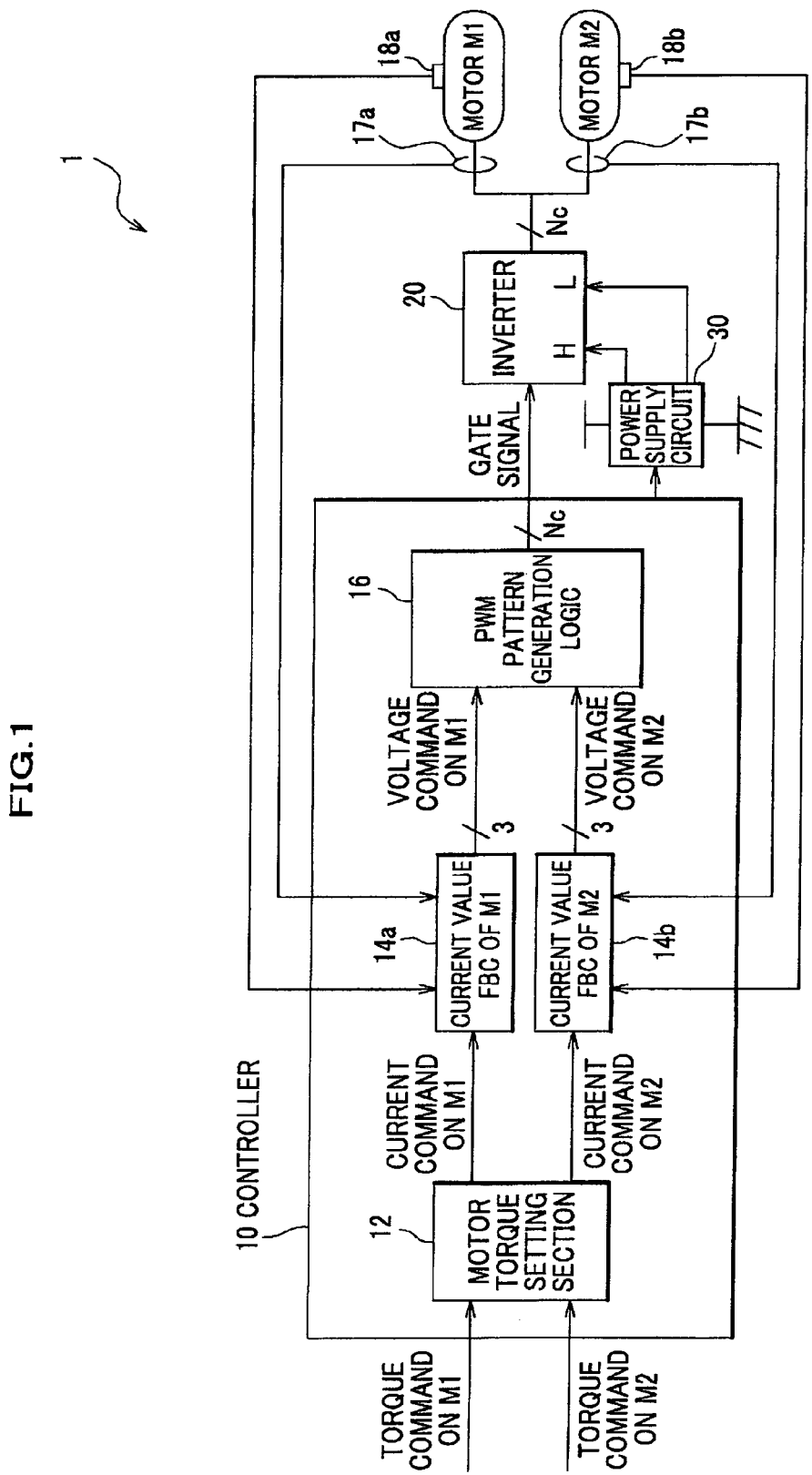
FIG. 1 is a schematic block diagram of a configuration example of a dual motor drive system according to a principle of the present invention.

Hereinafter, detailed description will be provided for embodiments of the present invention with reference to the related drawings.

The sane component will be denoted by the same reference numeral in the drawings.

FIG. 1 is a schematic block diagram of a configuration example of a dual motor drive system according to a principle of the present invention. A dual motor drive system 1 shown in FIG. 1 is used in an unshown higher-level device (host system) such as a vehicle, which is required to drive a motor M1 and a motor M2 at different rotating speeds and torques, respectively. As shown in FIG. 1, the dual motor drive system 1 of the present invention includes the motor M1, the motor M2, which are driven by the system 1, a supply circuit 30 that generates a voltage for driving the motors M1, M2 from a power source of the host system, a conventional inverter 20 that switches a driving voltage for the motor M1 and the motor M2, and a controller (a control unit) 10 that controls switching of switch elements constituting the inverter 20 in response to a torque command from the host system to the motor M1 and the motor M2. Furthermore, the motor M1 and the motor M2 of the dual motor drive system 1 are respectively provided with current sensors 17a, 17b for detecting currents through coils of the motors M1, M2, and rotation angle sensors 18a, 18b, at least one for each motor, for detecting rotational positions of rotors of the motors M1, M2.

For ease of explanation, the following description assumes that each of the motor M1 and the motor M2 is a three-phase motor having nine coils, but the present invention is not limited to this configuration.

The supply circuit 30 outputs a high voltage H and a low voltage L required for driving the motor M1 and the motor M2 by an appropriate power supply voltage of the host system. For ease of explanation, it is assumed that an output voltage (H-L) of the supply circuit 30 is a predetermined direct-current voltage. Generally, the low voltage L is 0 volt, or is grounded.

The controller 10 includes a motor torque setting section 12, current value feedback control sections (current value FBC in FIG. 1) 14a, 14b with respect to the motor M1 and the motor M2, and a PWM (pulse width modulation) pattern generation logic 16. The motor torque setting section 12 calculates a current flowing through each of the motor M1 and the motor M2 to generate torques in response to the torque commands to the motors M1, M2 from the host system (not shown), and then motor torque setting section 12 gives current commands to the motors M1, M2. A total amount of currents of the motors M1 and the motor M2 must be equal to or less than an allowable current of the inverter 20. The current is adjusted to be lower with respect to one of the motor M1 and the motor M2, the one to which a lower priority is set for the torque setting, and thereby the total amount of the currents of the motors M1, M2 is kept equal to or less than the allowable current of the inverter 20. It should be noted that the motor torque setting section 12 is an example of a unit that generates pulse width modulation control signals, as set forth in the appended claims.

The current value feedback control section 14a for the motor M1 performs vector control based on the dq conversion in the same manner as employed in the normal motor control, so that the current command to the motor M1 from the motor torque setting section 12 corresponds with an actual current of the motor M1. Thereby, the current value feedback control section 14a generates voltage commands on three phases (referred to as a phase U, a phase V, and a phase W) of the motor M1. Similarly, the current value feedback control section 14b of the motor M2 generates voltage commands on three phases (referred to as a phase u, a phase v, and a phase w) of the motor M2, based on a current command to the motor M2 from the motor torque setting section 12. In FIG. 1, a short diagonal line from bottom left to top right is indicated on a line connecting between elements, and a numeric character or a variable number is marked under the diagonal line. The numeric character or the variable number shows the number of the line. For example, each of the current value feedback control sections 14a, 14b outputs the voltage commands through three lines.

According to a first embodiment of the present invention, the PWM pattern generation logic 16 sets voltages of nine phases (uU, uV, uW, vU, vV, vW, wU, wV, wW) of coils in accordance with the voltage commands on the phase U, the phase V, and the phase W of the motor M1 and the voltage commands on the phase u, the phase v, and the phase w of the motor M2. The voltage commands are fed from the current value feedback control sections 14a, 14b, respectively. Then, the PWM pattern generation logic 16 generates the PWM patterns of the nine phases for the motor M1 and the motor M2, respectively, in the time-division manner. This operation will be explained in detail later. It should be noted that a combination of the current value feedback control sections 14a, 14b and the PWM pattern generation logic 16 is an example of a unit that feeds pulse width modulation control signals to the inverter, as set forth in claim.

The PWM patterns of the nine phases generated by the PWM pattern generation logic 16 are fed to control terminals of nine pairs of switching arms (hereinafter referred to as arms) constituting the inverter 20, so that outputs of the nine pairs of the arms are determined. The coils of the nine phases in each of the motor M1 and the motor M2 are driven by the outputs of the nine phases from the inverter 20. The number Nc shown in FIG. 1 is the number of arms constituting the inverter 20, and the number Nc is nine in the first embodiment.

In the following description, a portion including the motors M1, M2 and the inverter 20 of the circuit is referred to as a motor drive circuit.

With reference to FIGS. 2 to 5, description will be provided for a configuration of the motor drive circuit of the dual motor drive system 1 according to a first example of the first embodiment of the present invention.

The present invention has various aspects. According to one aspect, the present invention may be viewed as a dual motor drive system (the first embodiment of the present invention) for driving two motors with a predetermined condition individually by a single inverter. According to another aspect, the present invention may be viewed as a motor (a second embodiment of the present invention) to be used in such a dual motor drive system. According to further another aspect, the present invention may be viewed as a method of driving two motors with a predetermined condition individually by a single inverter.

Figure 2:
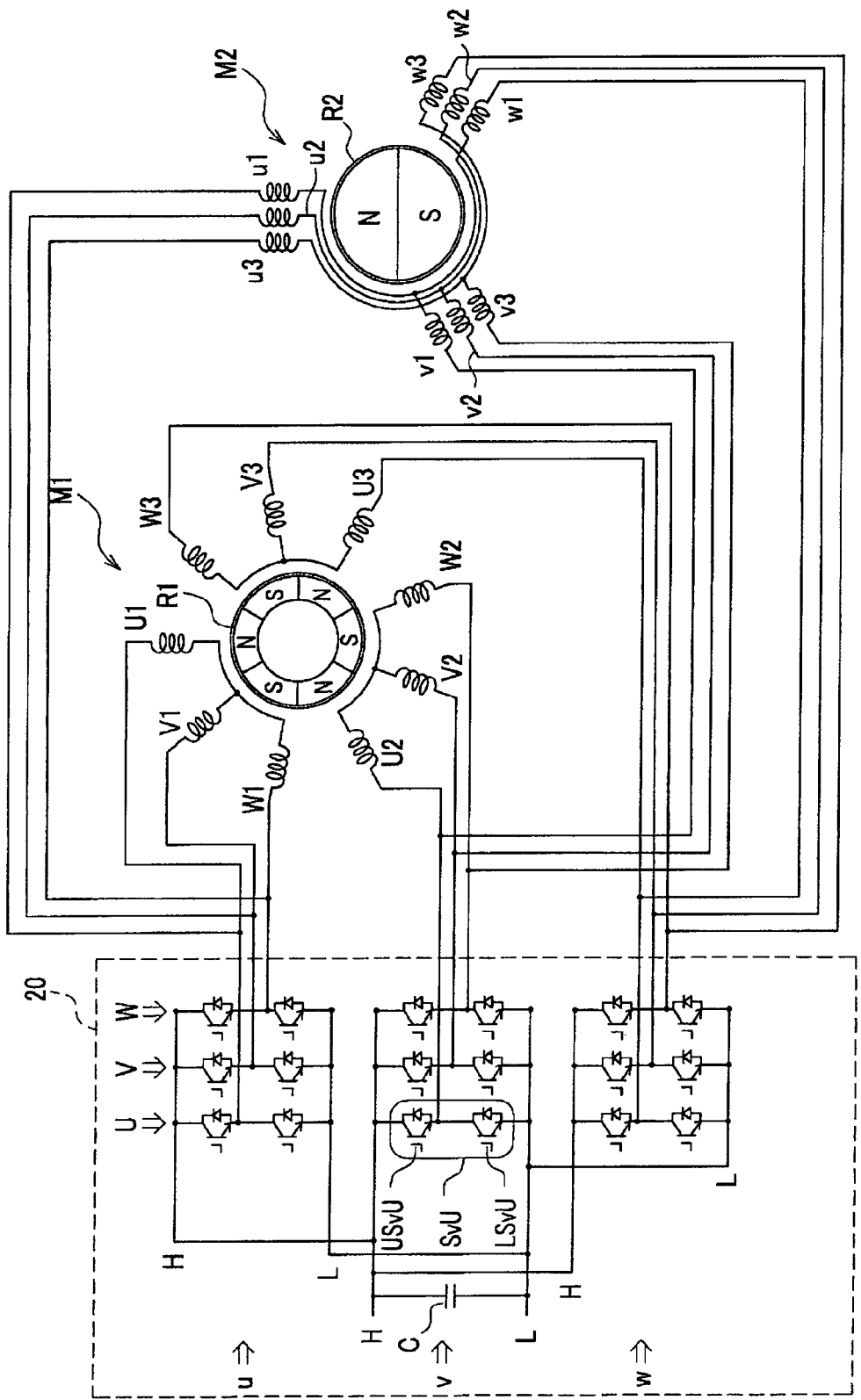
FIG. 2 is a circuit diagram of a configuration of a motor drive circuit of the dual motor drive system according to a first example of a first embodiment of the present invention.

FIG. 2 is a circuit diagram of a configuration of the motor drive circuit of the dual motor drive system 1 according to the first example of the first embodiment of the present invention. The motor drive circuit shown in FIG. 2 includes a nine-phase inverter 20 and the motors M1, M2, which are connected to the inverter 20. The motor M1 includes a rotor R1 having three pairs of magnetic poles and a stator having nine teeth. The motor M1 is a three-phase motor having a Y-connection of nine coils, each of which is wound around each of the nine teeth. The nine-phase coils of the motor M1 are respectively connected to the switching arms of the inverter 20, that is, output terminals of the arms (the output terminal of the arm is a connection point between two series-connected switching transistors).

Figure 5:
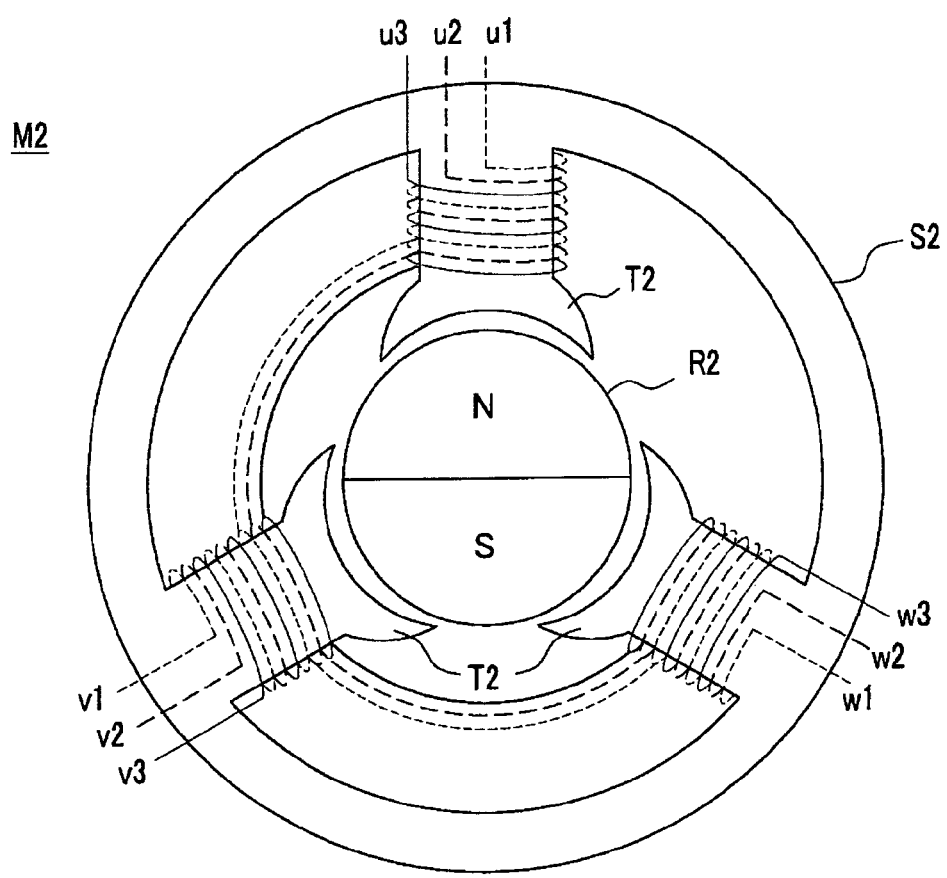
FIG. 5 schematically shows a configuration of the motor M2 shown in FIG. 2 according to the present invention.

When the two three-phase motors are driven by the single inverter, the number of phases of the inverter needs to be nine at minimum. The number of phases of the inverter needs to be the same as the number of phases of the coils of the motor. As exemplified later, a plurality of parallel-connected or series-connected coils may form one phase. Usually, a motor having the nine-phase coils like the motor M1 includes a rotor having three pairs of magnetic poles. However, a plurality of coils may be wound around one tooth so as to increase the number of the coils, and a motor having a rotor with less than or equal to two pairs of magnetic poles may be connected to the inverter having more than nine phases. An example of such a motor is illustrated as the motor M2 in the right-hand side of FIG. 2. FIG. 5 schematically shows a configuration of the motor M2 shown in FIG. 2 according to the present invention. As shown in FIG. 2 (the right-hand side) and FIG. 5, the motor M2 includes a rotor R2 having a pair of magnetic poles and a stator S2 having three teeth T2. The motor M2 is a three-phase motor having a Y-connection of nine coils, each three coils of which are wound around each tooth. As described above, the present invention is advantageous in that the size of the system 1 can be reduced by using the three-phase motor having the rotor with less than or equal to two pairs of magnetic poles.

As shown in FIG. 2, the inverter 20 has nine arms which are arranged in three rows (a horizontal direction on the plane of the drawing) u, v, and w, and in the three columns (a vertical direction on the plane of the drawing) U, V, and W. As is well known, each of the arms includes two series-connected switch elements, and both ends of the arm are connected to output terminals of the supply circuit 30 on the high voltage H side and on the low voltage L side, respectively. As shown in FIG. 2, the inverter 20 preferably, but may not, includes a smoothing capacitor C, and for convenience of drawing, the smoothing capacitor C is omitted in the drawings other than FIG. 2. Each of the arms of the inverter 20 is denoted by Sij, and upper and lower switch elements constituting the arm are denoted by USij and LSij, respectively. The character i denotes any one of the rows u, v, w, which corresponds to a position of the arm or the switch element. The character j denotes any one of the columns U, V, W, which corresponds to a position of the arm or the switch element. For example, the arm in the second row and the first column (that is, the row v and the column U) is denoted by SvU, and the lower and upper switch elements of the arm SvU are denoted by USvU and LSvU, respectively.

A corresponding output signal and an inverted signal of the output signal are fed from the PWM pattern generation logic 16 (see FIG. 1) to control terminals of the upper and lower switch elements USij, LSij of the arm Sij. A connection node of the upper and lower switch elements USij, LSij of the arm Sij is an output point of the arm Sij. Each of the coils of the motor M1 and the motor M2 is connected to an output point of the corresponding arm. The following description simply describes that a coil is connected to an arm, which means that the coil of the motor is connected to an output point of the arm.

As shown in FIG. 2, one ends of coils U1, V1, W1 of the motor M1 are commonly connected to one another, and the other end of each of the coils U1, V1, W1 is connected to each of arms SuU, SuV, SuW of the inverter 20, respectively. Similarly, one ends of coils U2, V2, W2 of the motor M1 are commonly connected to one another, and the other ends of the coils U2, V2, W2 are connected to arms SvU, SvV, SvW of the inverter 20, respectively. Also, one ends of coils U3, V3, W3 of the motor M1 are commonly connected to one another, and the other ends of the coils U3, V3, W3 are connected to arms SwU, SwV, SwW of the inverter 20, respectively. Therefore, when all of the arms SiU, SiV, SiW in the row i (=u, v or w) output the same voltage, that is, the high voltage H or the low voltage L, the same voltage is applied to three coils provided in the motor M1 and connected to the arms in the row i. Therefore, there is no effect on currents in the three coils, through which the currents have been flowing since the immediately preceding driving state.

As shown in FIG. 2, one ends of coils u1, v1, w1 of the motor M2 are commonly connected to one another, and the other ends of the coils u1, v1, w1 are connected to arms SuU, SvU, SwU of the inverter 20, respectively. Similarly, one ends of coils u2, v2, w2 of the motor M2 are commonly connected to one another, and the other ends of the coils u2, v2, w2 are connected to arms SuV, SvV, SwV of the inverter 20, respectively. Also, one ends of coils u3, v3, w3 of the motor M2 are commonly connected to one another, and the other ends of the coils u3, v3, w3 are connected to arms SuW, SvW, SwW of the inverter 20, respectively. Therefore, when all of the arms Suj, Svj, Swj in the column j (=U, V or W) output the same voltage, that is, the high voltage H or the low voltage L, the same voltage is applied to three coils provided in the motor M2 and connected to the arms in the column j. Therefore, there is no effect on currents in the three coils, through which the currents have been flowing since the immediately preceding driving state.

Figure 3:
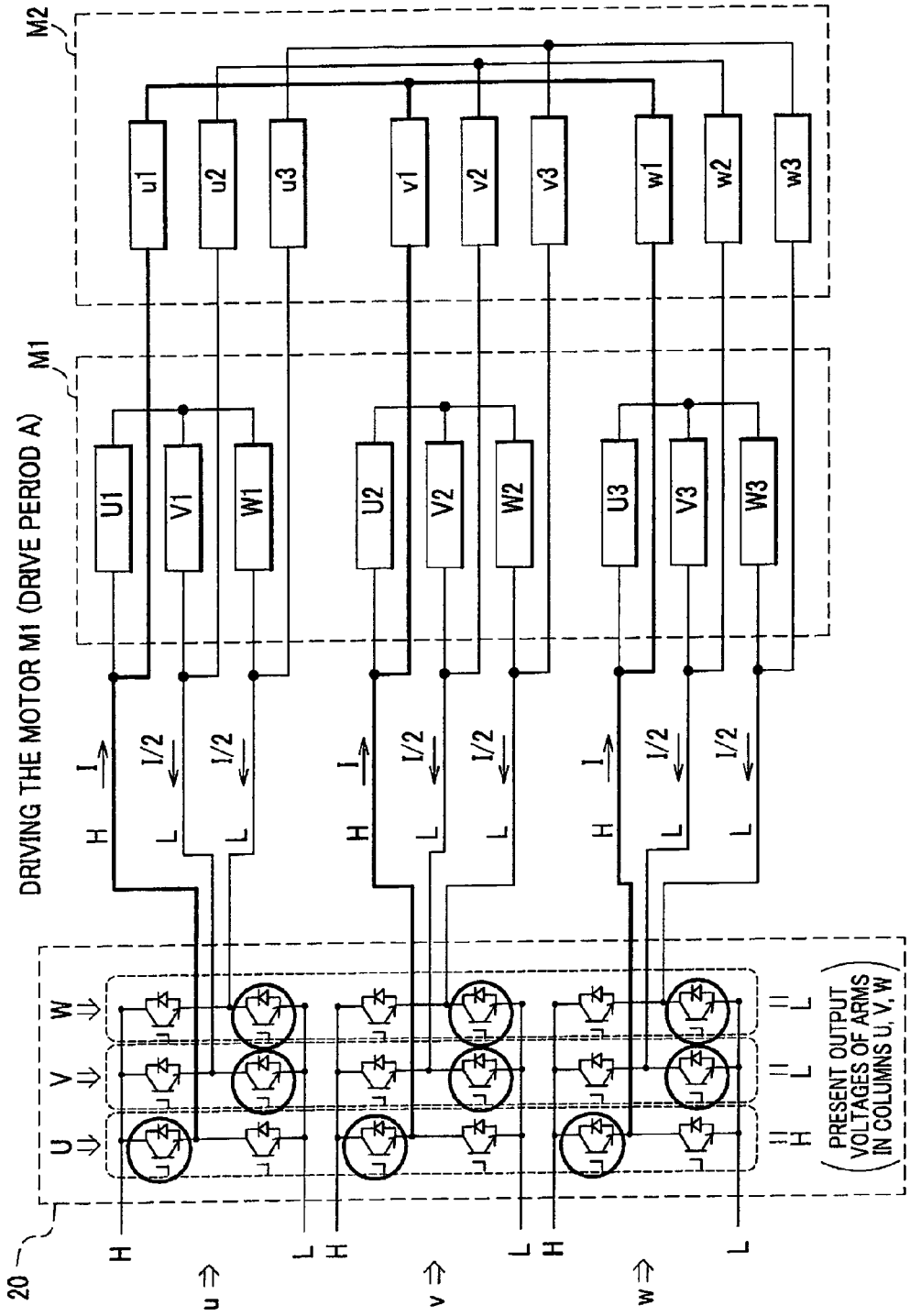
FIG. 3 explains a principle of controlling an inverter in columns when driving a motor M1 of the motor drive circuit shown in FIG. 2.
Figure 4:
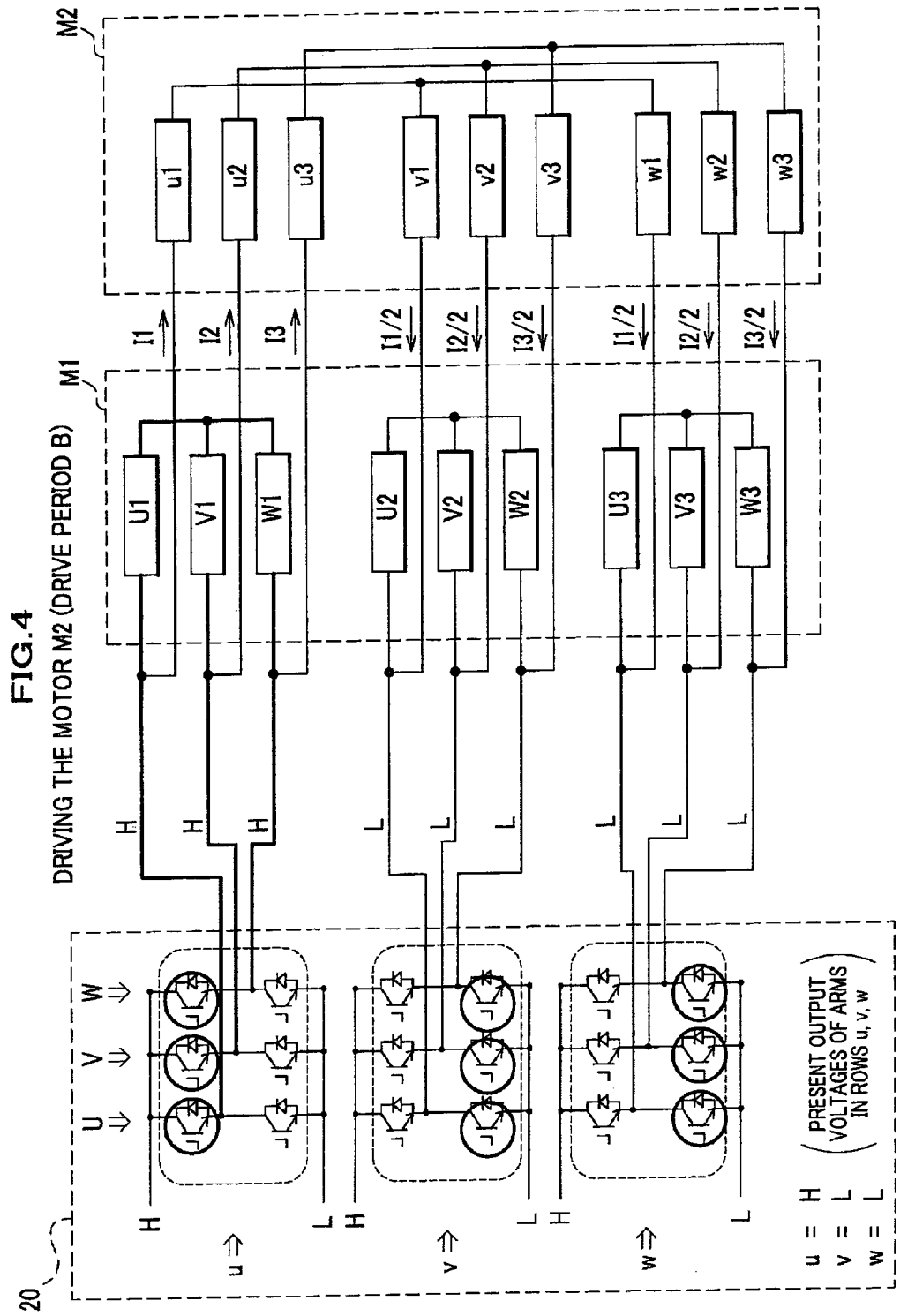
FIG. 4 explains a principle of controlling the inverter in rows when driving a motor M2 of the motor drive circuit shown in FIG. 2.

With reference to FIGS. 3 to 8, description will be provided for an operation of the dual motor drive system 1 configured as described above. FIG. 3 explains a principle of controlling the inverter 20 in the columns when driving the motor M1 of the motor drive circuit shown in FIG. 2. FIG. 4 explains a principle of controlling the inverter 20 in the rows when driving the motor M2 of the motor drive circuit shown in FIG. 2. As described in detail later, the inverter 20 (i.e. the motor M1 and the motor M2) is controlled in a time-division manner according to the first example of the first embodiment of the present invention. As can be seen in FIGS. 3 and 4, the motor M1 having the rotor with three pairs of magnetic poles and the motor M2 having the rotor with a pair of magnetic poles have the same configuration of an electric circuit in that both of the motor M1 and the motor M2 have three groups of three phase coils. In order to distinguish between coils of the motor M1 and the motor M2, the coils of the motor M1 are denoted by capital letters and the coils of the motor M2 are denoted by small letters.

As shown in FIGS. 3 and 4, among the switch elements constituting the inverter 20, the switch elements marked with a circle are turned on, and the other switch elements are turned off. For example, as shown in FIG. 3, when the motor M1 is driven, all of the arms in the column U output the high voltage H, and all of the arms in the columns V and W output the low voltage L. When the arms in each of the columns U, V, W output the same voltage as described above, the coils provided in the motor M2 and connected to the arms Suj, Svj, Swj have the same electric potential and substantially have no voltage applied thereto. Because the coils of the motor M2 are not driven during such a period, currents in the coils of the motor M2 circulate and attenuate through the turned-on switch elements of the inverter 20 in accordance with an immediately preceding driving state (circulation mode). For example, the high voltage H is applied to all of the coils u1, v1, w1, which are provided in the motor M2 and connected to the arms in the column U of the inverter 20, and therefore there is no effect on the currents flowing through the coils u1, v1, w1. On the other hand, as for the arms in the rows, the high voltage H and the low voltages L, L are applied to the coils U1, V1, W1 of the motor M1, respectively. When a current 1 flows into the coil U1, a current I/2 flows from each of the coils V1 and W1. Therefore, the PWM pattern generation logic 16 feeds a PWM pattern to the coils of the motor M1 and the motor M2, so that the arms in each of the columns U, V, W of the inverter 20 outputs the same voltage, in other words, the same driving pattern is generated in all of the groups of the coils U, V, W of the motor M1. Thereby, it is possible to drive the motor M1 without exerting any effects on the motor M2.

Similarly, as shown in FIG. 4, when the motor M2 is driven, all of the arms in the row u output the high voltage H, and all of the arms in the rows v and w output the low voltage L. When the arms in each of the rows u, v, w output the same voltage as described above, the three coils provided in the motor M1 and connected to the arms SiU, SiV, SiW has the same electric potential and substantially have no voltage applied thereto. Because the coils of the motor M1 are not driven during such a period, currents in the coils of the motor M1 circulate and attenuate through the turned-on switch elements of the inverter 20 in accordance with an immediately preceding driving state (circulation mode). On the other hand, as for the arms in the columns, the high voltage H and the low voltages L, L are applied to the coils u1, v1, w1 of the motor M2, respectively. When a current 11 flows into the coil u1, a current I1/2 flows from each of the coils v1 and w1. Therefore, the PWM pattern generation logic 16 feeds a PWM pattern to the coils of the motor M1 and the motor M2 so that the arms in each of the rows u, v, w of the inverter 20 outputs the same voltage, in other words, the same driving pattern is generated in each of the groups of the coils u, v, w of the motor M2. Thereby, it is possible to drive the motor M2 without exerting any effects on the motor M1. As shown in FIG. 4, for example, when the arms in the rows u, v, w output the high voltage H and the low voltages L, L, respectively, currents I1, I2, I3 (I1=I2=I3) flow into the coils u1, u2, u3. Then, current I1/2 flow from each of the coils v1, w1, current I2/2 flow from each of the coils v2, w2, and current I3/2 flow from each of the coils v3, w3. In this instance, there is no effect on the currents flowing through the coils of the motor M1.

It is, therefore, possible to drive the motor M1 and the motor M2 individually (at an individually set rotating speed and torque) by means of the single inverter 20 by alternately driving the motor M1 and the motor M2 in a time-division manner.

There have been known the rectangular wave drive (or current) method, the trapezoid wave drive method, the pseudo sine wave drive method or the like as a conventional method of driving a direct-current motor by an inverter. In embodiments of the present invention, it is preferable to use the pseudo sine wave drive method in consideration of vibrations and noises.

Figure 6A:
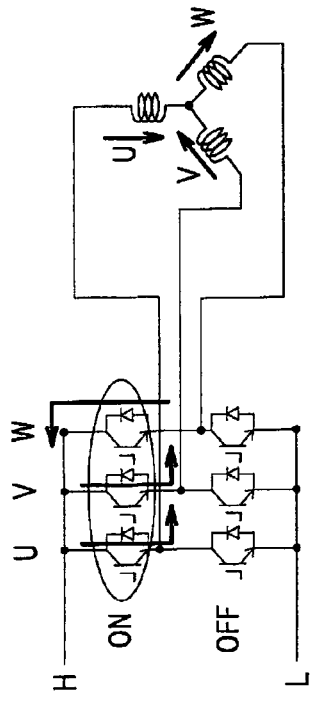
FIGS. 6A to 6D illustrate an example of driving a conventional direct-current three-phase motor in order to explain a difference between the dual motor drive system according to the present invention and the conventional motor drive system.
Figure 6B:
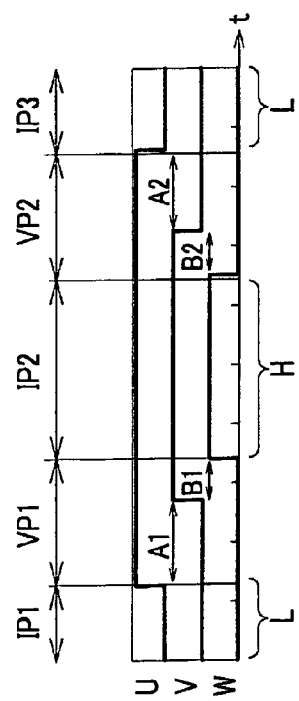
Figure 6C:
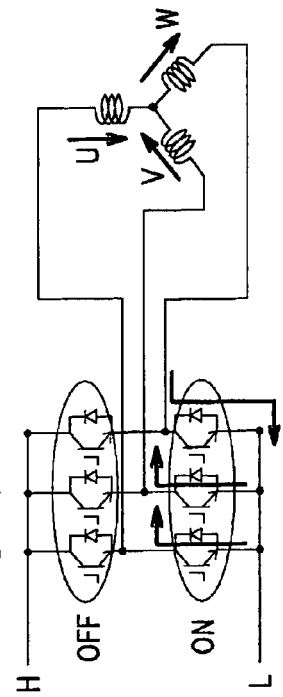

Next, a difference between the dual motor drive system according to the present invention and a conventional motor drive system will be considered hereinafter. FIGS. 6A to 6D illustrate driving a conventional direct-current three-phase motor alone. FIGS. 6A and 6C are graphs showing two examples of waveforms of voltages applied to three phase coils U, V, W. In FIG. 6A, the reference marks IP (IP1~IP3) denote periods during which the same voltage (the high voltage H or the low voltage L) is applied to the three phase coils U, V, W. Because the motor is not driven during the periods IP1~IP3, these periods will be referred to as "inoperative periods". FIG. 6B illustrates an operating condition of the motor drive system during the inoperative period IP2 of the drive waveform shown in FIG. 6A. A voltage is applied to each phase coil of the motor to have a current flow therethrough during periods A1, B1, A2, B2, which are included in driving periods VP1, VP2 and in which the timings of the phases of the coils U, V, W are different. All of the three phase coils U, V, W are maintained at the high voltage during the inoperative period IP2. This means that a switch on a high voltage side of an inverter is turned on and a switch on a low voltage side of the inverter is turned off. Therefore, during the inoperative period IP2, a current generated by a drive voltage during the preceding drive period VP1 passes and circulates through the switch on the high voltage side of the inverter. In FIG. 6B, an arrow in a heavy line indicates a direction to which a current flows.

Figure 7A:
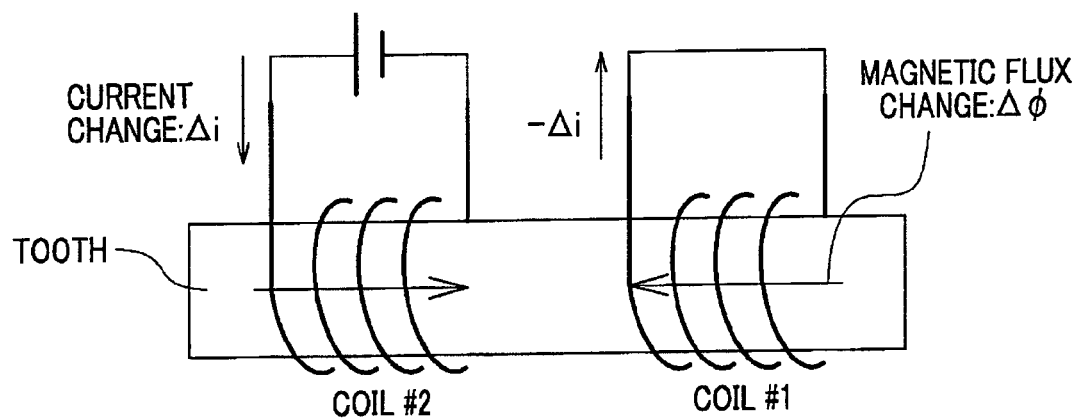
FIGS. 7A and 7B illustrate a technique of driving a plurality of coils wound around one tooth.
Figure 7B:
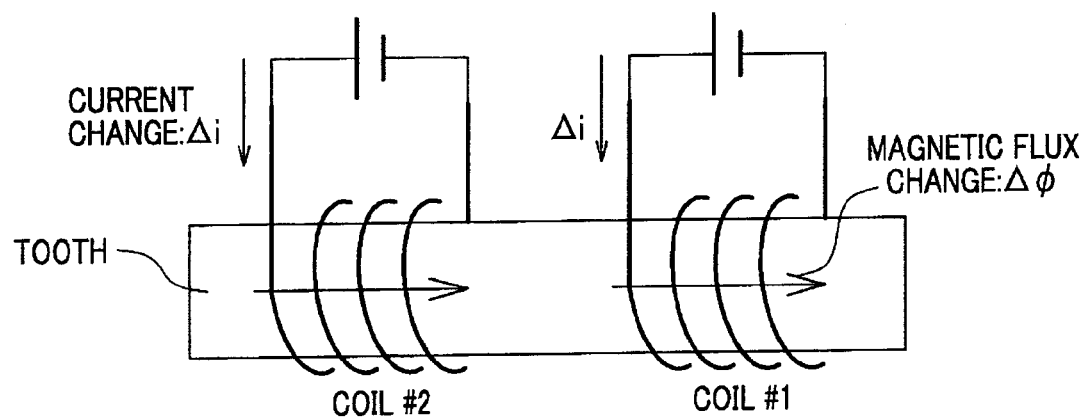

The conventional direct-current motor is driven in the manner described above. This is because there is hardly any effect of mutual inductance between the coils, each of which is wound around a separate tooth. According to the present invention as described above, however, the motor to be used has a plurality of parallel-connected coils wound around one tooth. FIGS. 7A and 7B illustrate a technique of driving a plurality of coils wound around one tooth. When the plurality of coils is wound around one tooth in parallel, there occurs approximately the same amount of mutual inductance as that of the self-inductance between the coils wound around the same tooth. As shown in FIG. 7A, when a voltage is applied to a coil #2 to have a current flow therethrough while a current flows through a coil #1 (that is, the coil #1 is on a conduction state), there occurs a magnetic flux change $\Delta\phi$ generated by a current change of the coil #2. Then, a change $\Delta i$ occurs in the current flowing through the coil #2 so as to cancel the magnetic flux change $\Delta\phi$. As a result, there does not occur a change in magnetic flux (a total amount of magnetic fluxes in the right and left directions in FIG. 7A) of the whole tooth. Therefore, when a voltage is applied to the coil #2 while the coil #1 is in a conduction state, a massive current flows through the coil #2 because there does not occur an induced voltage in the coil #2. For preventing the above-described situation in the dual motor drive system 1 of the present invention, which uses a motor having a plurality of coils wound around each tooth, as shown in FIG. 7B, it is necessary to adjust a timing for switching phases (arms) connected to the coils, and apply the voltage to the coils simultaneously, when having a current flow through the coils (the coils #1, #2 in FIG. 7B) wound around the same tooth.

Figure 6D:
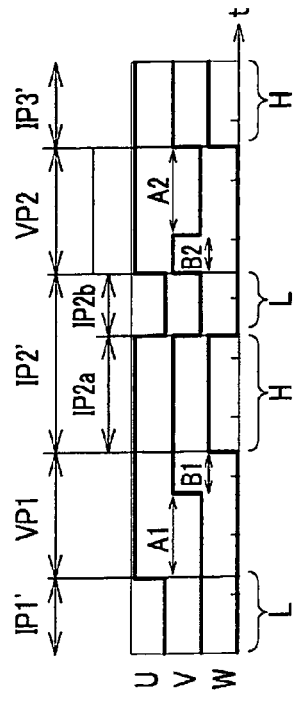

Returning to FIGS. 6A to 6D, description will be provided for means of solving the above-described problem. In the drive waveform of the inverter shown in FIG. 6C according to the present invention, an inoperative period IP2' is divided into two periods IP2a and IP2b, and the drive voltage is switched from the high voltage H to the low voltage L at a boundary point between the periods IP2a and IP2b. Thereby, the drive voltage during the period IP2b, which is the latter period of the inoperative period IP2', is the low voltage L. FIG. 6D illustrates a driving condition of a motor during the period IP2b when the motor is driven in the manner described above. As can be seen from the comparison between FIGS. 6B and 6D, when the state that a switch element on the high voltage side is turned on (FIG. 6B) during the inoperative period IP2a is changed to the state that a switch element on the low voltage side is turned on (FIG. 6D), only a current path changes in the inverter, and there is no effect on the currents flowing through the coils U, V, W. More specifically, the switching operation exerts no effects on the current flowing through the phase coils, because the same voltage is always applied to the phase coils as long as voltages applied to the phase coils of the motor are switched simultaneously during the inoperative period IP2' (excluding an edge portion of the period) shown in FIG. 6C. The above-described principle may be applied to the case where plural groups of the phase coils wound in one motor. The present invention employs the above-described principle to drive the motors, which will be described in detail later. In FIG. 6C, a drive voltage during the inoperative period IP3' is the high voltage H (a drive voltage during the inoperative period IP3 is the low voltage L as shown in FIG. 6A), so that the adjacent inoperative periods have alternate drive voltages.

Figure 8:
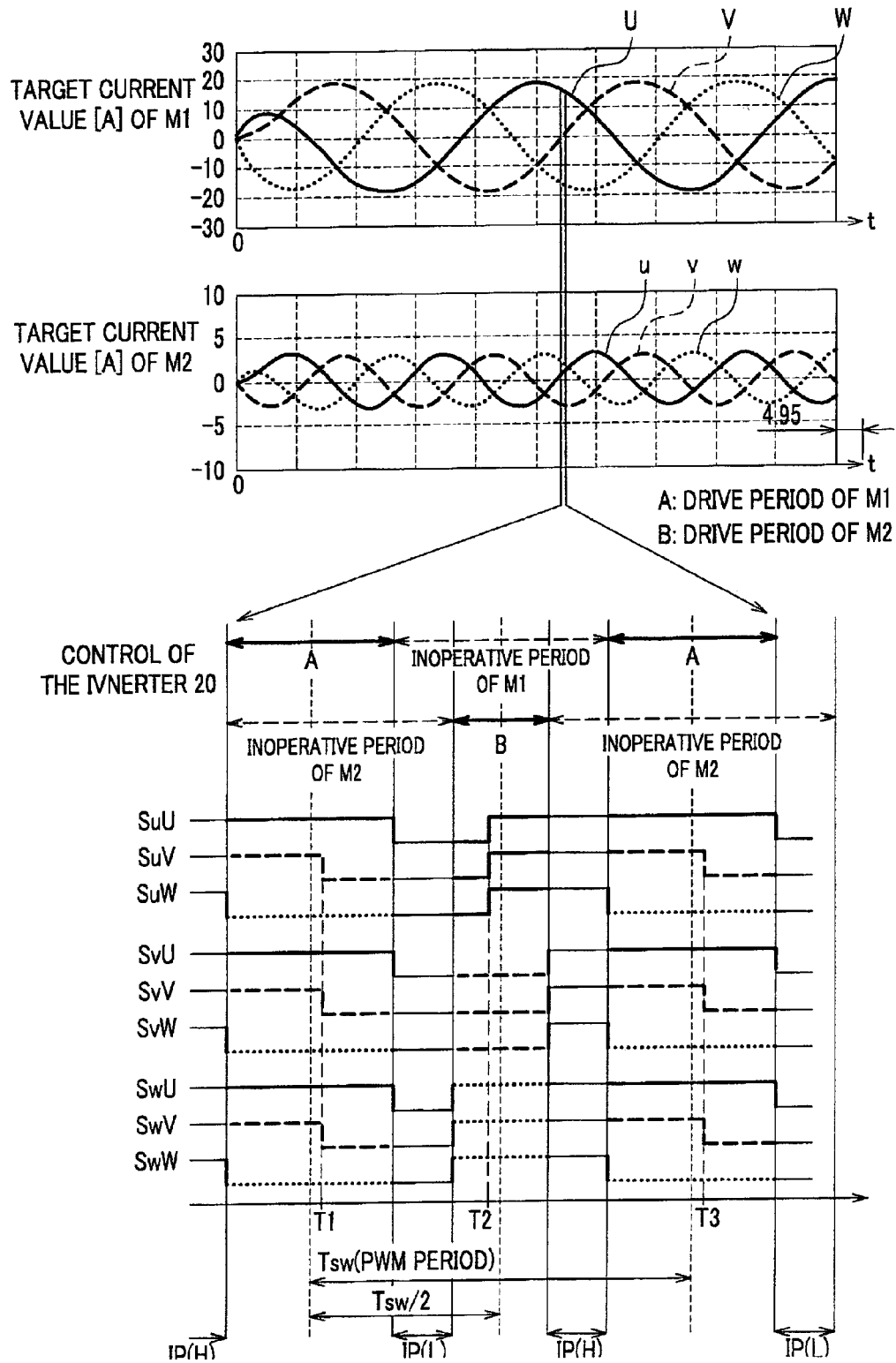
FIG. 8 illustrates driving the motor M1 and the motor M2 in a time-division manner according to the first example of the first embodiment of the present invention.

FIG. 8 illustrates a control method based on the principle of driving the dual motors according to the present invention as described above. In the upper section of FIG. 8, two graphs illustrate currents waveforms indicating target current values of the phase coils of the motor M1 and the motor M2. Curved lines showing the current waveforms of the phases U, V, W in the upper graph for the motor M1 and the phases u, v, w in the lower graph for the motor M2 are drawn in a solid line, dashed line, or dotted line, respectively. According to a principle of the present invention, the motor M1 and the motor M2 are controlled in the time-division manner based on PWM patterns in a waveform period Tsw, which is much shorter than the shorter one (the motor 2 in FIG. 8) of the waveform periods of the motor M1 and the motor M2. The lower section of FIG. 8 illustrates a timing chart of enlarged drive voltage waveforms of the coils during the extremely short waveform period in the desired current waveform as shown in the upper section of FIG. 8. As shown in the timing chart, the motor M1 is controlled during a predetermined drive period A, which is included in an inoperative period of the motor M2, and a predetermined inoperative period. The motor M2 is controlled during a predetermined drive period B, which is included in an inoperative period of the motor M1, and a predetermined inoperative period.

During inoperative periods IP (H) and IP (L), which are commonly provided for the motor M1 and the motor M2, the same voltage, that is, the high voltage H or the low voltage L is applied to all coils in the motor M1 and the motor M2, and therefore neither the motor M1 nor the motor M2 is driven during the inoperative periods IP (H) and IP (L). In the drive period A of the motor M1, the three drive voltages SuU, SvU, SwU each having the phase U (indicated by the solid line) of the motor M1 are concurrently switched from the high voltage H to the low voltage L at the end of the drive period A (according to the principle described above with reference to FIGS. 6A to 6D, the drive voltages of the three phase coils u1, v1, w1 of the motor M2 are simultaneously switched during the inoperative period of the motor M2). The three drive voltages SuV, SvV, SwV each having the phase V (indicated by the dashed line) of the motor M1 are concurrently switched from the high voltage H to the low voltage L at a time (T1 or T3) during the drive period A (similarly, the drive voltages of the three phase coils u2, v2, w2 of the motor M2 are simultaneously switched during the inoperative period of the motor M2). The three drive voltages SuW, SvW, SwW each having the phase W (indicated by the dotted line) of the motor M1 (the drive voltages of the three phase coils u3, v3, w3 of the motor M2) are concurrently switched from the high voltage H to the low voltage L at the start of the drive period A. Similarly, the three drive voltages SuU, SuV, SuW each having the phase u (indicated by the solid line) of the motor M2 are concurrently switched from the low voltage L to the high voltage H at a time T2 during the drive period B of the motor M2, (the drive voltages of the three phase coils U1, V1, W1 of the motor M1 are simultaneously switched during the inoperative period of the motor M1). The three drive voltages SvU, SvV, SvW each having the phase v (indicated by the dashed line) of the motor M2 (the drive voltages of the three phase coils U2, V2, W2 of the motor M1) are concurrently switched from the low voltage L to the high voltage H at the end of the drive period B. The three drive voltages SwU, SwV, SwW each having the phase w (indicated by the dotted line) of the motor M2 (the drive voltages of the three phase coils U3, V3, W3 of the motor M1) are concurrently switched from the low voltage L to the high voltage H at the start of the drive period B.

To sum up the above description, during the drive period (including edges of the period) of one of the two motors, the drive voltages of the coils having all the phases (U, V, W or u, v, w in FIG. 2) of the other motor (the motor in the inoperative period) may be concurrently switched in each of the groups of the coils (the coils each denoted by 1, 2, or 3 in the reference numerals in FIG. 2) of the other motor, but the drive voltages must be always maintained at the same voltage. The above-described condition may be expressed as follows by using the drive voltage waveforms for controlling the inverter 20 as shown in FIG. 8. Namely, during the drive period (including edges of the period) of each of the two motors, the drive voltage waveforms of the coils having all the phases (U, V, W or u, v, w) must be the same pattern in each of the groups of the coils of the motor (the motor in the drive period). The above-described condition is one of the principles of the present invention, and is used because of the fact that the switching operation exerts no effects on the currents flowing through the phase coils, because the same voltage is always applied to the phase coils as long as voltages applied to the phase coils of the motor are switched simultaneously during the inoperative period (excluding the edge portion of the period), as described above with reference to FIGS. 6A to 6D.

Furthermore, a common inoperative period (for example, the periods IP (H) and IP (L) in FIG. 8), during which both of the two motors are in the circulation mode, may be provided between the drive periods of the two motors. As long as the above-described condition is satisfied, the drive voltage may be switched at any timing during the drive period (including edges of the period). In the example shown in FIG. 8, on-time portion of each phase of the motor M1 for the drive period A is determined by the timing to switch from the high voltage H to the low voltage L, and on-time portion of each phase of the motor M2 for the drive period B is determined by the timing to switch from the low voltage L to the high voltage H. As long as the above-described condition is satisfied, the switching timing may not always be the same as that shown in FIG. 8, and the above-described control may be carried out at a different timing.

As described above, during the drive period (including edges of the period) of one of the two motors, the drive voltages of the coils having all the phases (U, V, W or u, v, w) of the other motor may be concurrently switched in each of the groups of the coils of the other motor, but the drive voltages must be always maintained at the same voltage. Also, during the drive period (including edges of the period) of each of the two motors, the drive voltage waveforms of the coils having all the phases (U, V, W or u, v, w) must be the same pattern in each of the groups of the coils of the motor (the motor in the drive period). These conditions are naturally satisfied by controlling the inverter 20 in the manner described above with reference to FIG. 3 and 4. Conversely, when these conditions are satisfied, the inverter 20 is naturally controlled in the manner described above with reference to FIG. 3 and 4.

Returning to FIG. 8, the predetermined drive period A and the predetermined drive period B are allocated for the motor M1 and the motor M2, respectively, so that the motor M1 and the motor M2 are controlled in the time-division manner. The motor is controlled with a PWM pattern in accordance with the torque command given to the motor to be controlled from outside and an output from the rotation angle sensors 18*a*, 18*b* of the respective motors. The motor may be controlled in accordance with an output from the current sensors 17*a*, 17*b* of the respective motors. The drive periods A and B of the motors M1 and M2 may not be of the same length as those shown in FIG. 8. Each of the motor M1 and the motor M2 may be driven for a necessary time of the allocated drive period. The output voltage (H-L) of the supply circuit 30 may be changed by the controller 10, depending on the drive periods A and B, so that a different drive voltage may be used for the motor M1 and the motor M2.

With the present invention described above, it is possible to drive the two motors individually by the single inverter in the time-division manner.

In the motor M2 having a pair of magnetic poles, the coils u1, u2, u3 each having the phase u are wound around the same tooth, and the coils u1, u2, u3 are driven simultaneously when the motor M2 is driven. Accordingly, the currents in the coils u1, u2, u3 are as much as three times the current through one coil. It is, therefore, possible to connect the nine-phase inverter with the motor having a pair of magnetic poles by winding a plurality of coils around one tooth as described above, and thereby the two motors can be driven individually by the single inverter according to the present invention.

Next, with reference to FIGS. 9(*a*) to (*c*) and 12(*a*) to (*c*), comparison will be made between the dual motor drive system according to the present invention and a conventional motor drive system.

Figure 12:
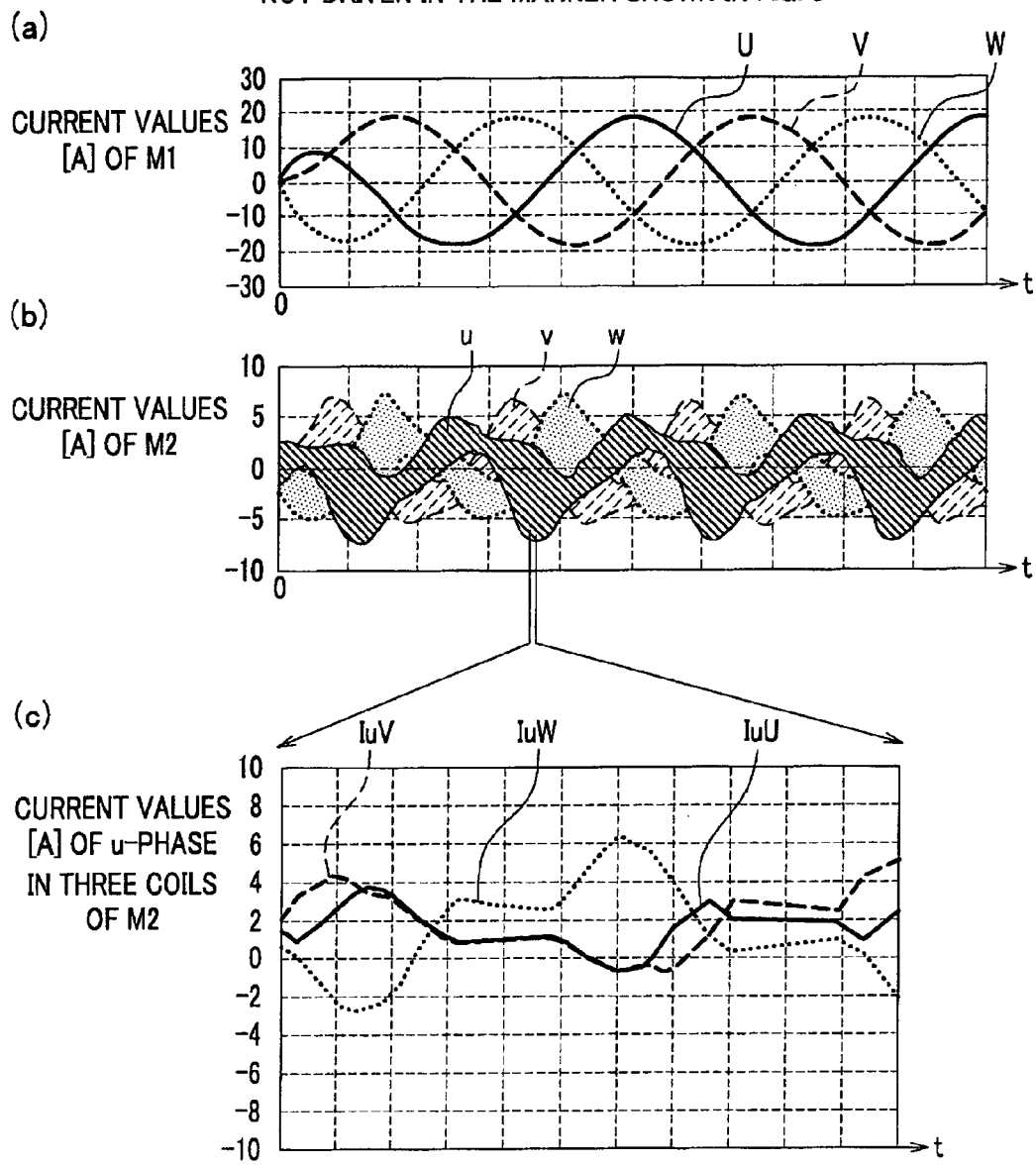
FIG. 12(a) to (c) illustrates an example of currents in the coils of the two motors in the circuit, in which one of the motors has the parallel-connected coils wound around the tooth as shown in FIG. 2, when the motors are not driven in the manner shown in FIG. 8.

FIG. 12(*a*) to (*c*) illustrates an example of currents in the coils of the two motors in the circuit, in which one of the motors has the parallel-connected coils wound around the tooth as shown in FIG. 2, when the motors are not driven in the manner shown in FIG. 8. FIG. 12(*a*) and (*b*) illustrates an example of currents in the coils of the motors M1 and M2, when the two motors are driven in the motor drive circuit shown in FIG. 2 in the manner shown in FIG. 7A. FIG. 9(*a*) to (*c*) illustrates an example of currents in the coils in the circuit shown in FIG. 2, when the motors are driven in the manner shown in FIG. 8. FIG. 9(*a*) and (*b*) illustrates an example of currents in the coils of the motor M1 and the motor M2, respectively. FIGS. 9(*c*) and 12(*c*) are enlarged views of waveforms of the currents in the coils of the motor M2 in a time axis direction. FIGS. 9(*a*) to (*c*) and 12(*a*) to (*c*) show the waveforms of the currents based on graphs obtained from measurements. In FIGS. 9(*a*)(*b*) and 12(*a*)(b), each of current waveforms U, V, W and u, v, w of the motors M1 and M2 collectively shows current waveforms of the corresponding phase in each of the groups of the coils. For example, the current waveform U of the motor M1 shows the currents in the three coils U1, U2, U3 having the phase U in a superimposed manner. Similarly, the current waveform u of the motor M2 shows the currents in the three coils u1, u2, u3 having the phase u in a superimposed manner.

As shown in FIG. 12(*a*), because the current waveforms of the three phases U, V, W of the motor M1 are indicated by one curved line, respectively, it shows that the coils having the same phase have the same current in all of the groups of the coils. However, in the graph of the motor M2, as shown in FIG. 12(*b*), the current waveform of each phase shows oscillation in an envelope having an irregular width (for convenience of drawing, a region surrounded by the envelope of each phase is illustrated by hatching in the drawing). As can be seen in FIG. 12(*c*), which is an enlarged view of the graph of the current of the phase u shown in FIG. 12(*b*) in the time axis direction, three currents IuU, IuV, IuW having the phase u of the motor M2 have irregular waveforms and most portions of the waveforms do not match each other, due to ripple currents caused by mutual inductance.

Figure 9:
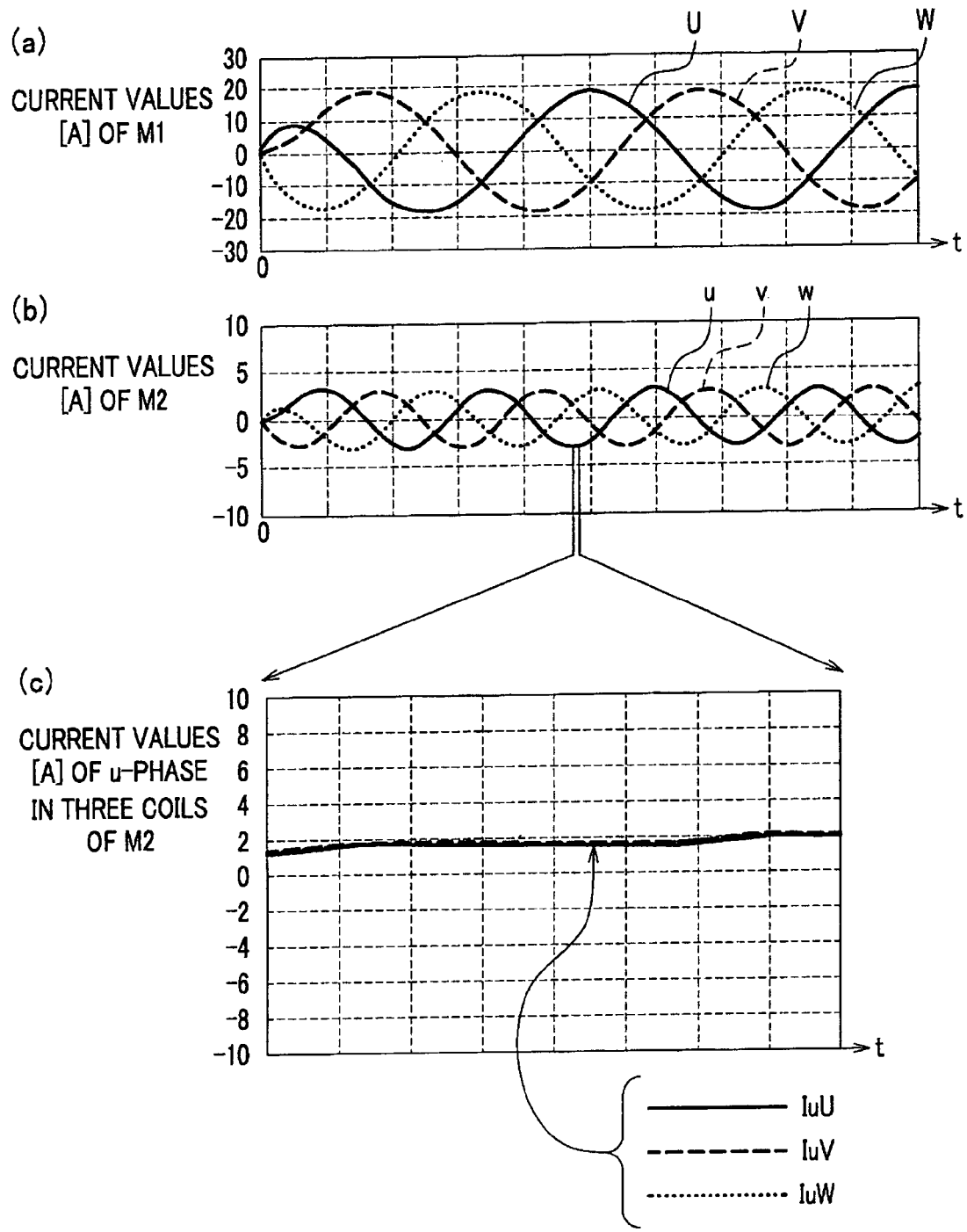
FIG. 9(a) to (c) illustrates an example of currents in the coils in the circuit shown in FIG. 2, when the motors are driven in the manner as shown in FIG. 8.

On the contrary, in FIG. 9(*a*) and (*b*), the current waveforms of the three phases u, v, w are indicated by one curved line in the graph of the motor M2 as well as in the graph of the motor M1. As can be seen in FIG. 9(*c*), which is an enlarged view of the graph of the current of the phase u shown in FIG. 9(*b*) in a time axis direction, the three currents IuU, IuV, IuW having the phase u of the motor M2 show stable waveforms and most portions of the waveforms matches each other, because ripple currents caused by mutual inductance are eliminated.

As described above, when the conventional drive method is employed in the dual motor drive system using the motor having a plurality of coils wound around each tooth, there occur more current ripples in the currents in the coils of the motor having a plurality of coils wound around each tooth, and thereby it is difficult to obtain desired rotation performance. According to the present invention, however, it is possible to drive each of the two motors with a desired rotation speed and torque in such a dual motor drive system.

Figure 10A:
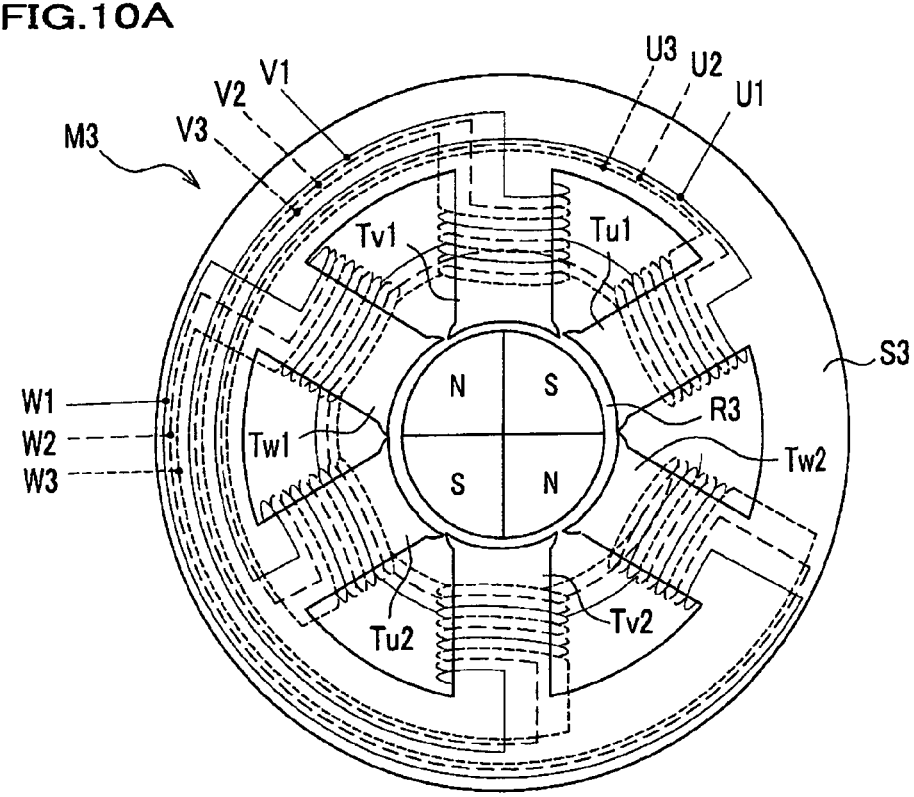
FIGS. 10A and 10B illustrate an example of a motor according to a second embodiment of the present invention.
Figure 10B:
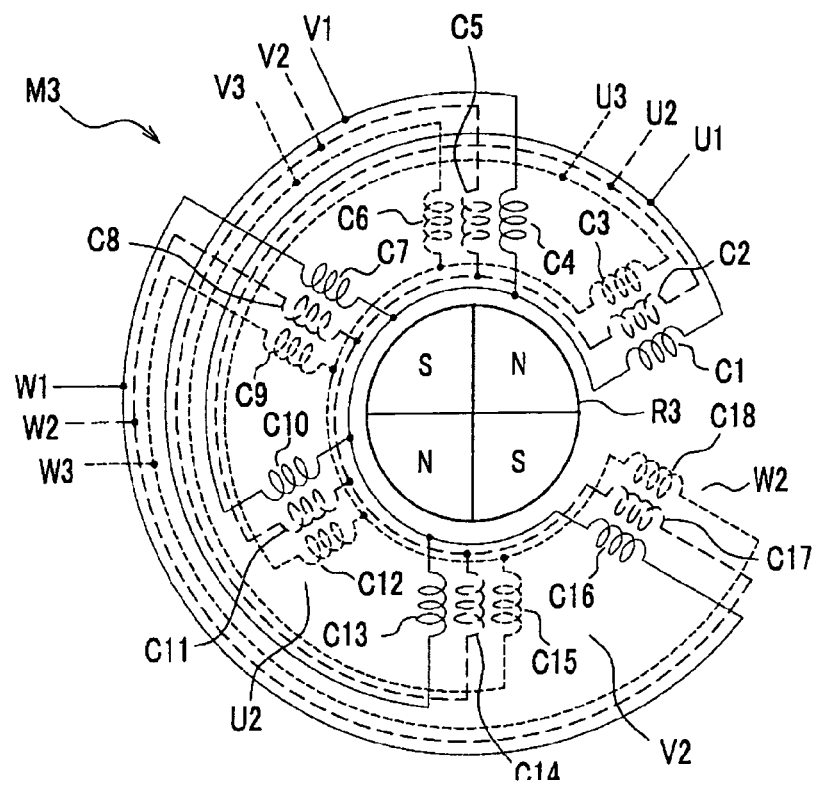

FIGS. 10A and 10B illustrate an example of a motor according to a second embodiment of the present invention. FIG. 10A shows a configuration of the motor, and FIG. 10B schematically shows the configuration of the motor. A motor M3 shown in FIGS. 10A and 10B is another example of the motor that can be driven by the nine-phase inverter shown in FIG. 2. In FIGS. 10A, the motor M3 includes a rotor R3 having two pairs of magnetic poles and a stator S3 having six teeth Tu1, Tv1, Tw1, Tu2, Tv2, Tw2. Three groups of three phase coils are wound around the six teeth of the stator S3. More specifically, three opposing groups of a tooth pair Tu, Tv, Tw of the stator S3 constitute the three phases U, V, W, respectively. Three coils having the phase α (α=u, v, w) are wound around each of opposing teeth Tα1, Tα2 in the same manner. Two coils, which have the same phase and are in the same group of the coils, are wound around the opposing teeth Tα1, Tα2 and are connected in parallel. Furthermore, the coils having the phases U, V, W in each group of the coils are connected in a Y-connection, respectively. More specifically, as shown in FIG. 10B, 18 coils (=6 teeth×3 coils) constituting the motor M3 are denoted by C1, C2, . . . , C18 in a counter-clockwise direction from the coil wound around the teeth Tu1 and having the phase U in the group denoted by 1 in the reference numeral, and then the motor M3 has the connection as follows. Namely, in the opposing tooth pair Tu1, Tu2 having the phase U, the coils in the same group, i.e., (C1, C10), (C2, C11), (C3, C12) are connected in parallel, respectively, and one ends of the pairs of the parallel-connected coils are used as drive terminals U1, U2, U3, respectively. In the opposing tooth pair Tv1, Tv2 having the phase V, the coils in the same group, i.e., (C4, C13), (C5, C14), (C6, C15) are connected in parallel, respectively, and one end of each of the pairs of the parallel-connected coils are used as drive terminals V1, V2, V3. In the opposing tooth pair Tw1, Tw2 having the phase W, the coils in the same group, i.e., (C7, C16), (C8, C17), (C9, C18) are connected in parallel, respectively, and one end of each of the pairs of the parallel-connected coils are used as drive terminals W1, W2, W3. In order to connect the coils in a Y-connection, the opposing terminals to the drive terminals of the coils C1, C4, C7, C10, C13, C16 having the phase U, V, W in the group of the coils indicated by 1 in the reference numeral are connected to one another. The opposing terminals to the drive terminals of the coils C2, C5, C8, C11, C14, C17 having the phase U, V, W in the group of the coils indicated by 2 in the reference numeral are connected to one another. The opposing terminals to the drive terminals of the coils C3, C6, C9, C12, C15, C18 having the phase U, V, W in the group of the coils indicated by 3 in the reference numeral are connected to one another.

The above-described motor M3 has the three groups of the three phase coils having the phases U, V, W, i.e., the groups of U1, V1, W1, U2, V2, W2, and U3, V3, W3, and therefore it is possible to connect the motor M3 with the dual motor drive system 1 shown in FIG. 1 in the same manner as the motor 2 described above.

The above description has been provided as an example of the embodiments in order to explain the present invention. Various changes, modifications, or additions may be made in the above-described embodiments within the scope of the technical idea and principle of the present invention.

For example, in the above description, the inverter having the nine phases or the nine arms in 3 rows×3 columns is used. However, the present invention is not limited to this configuration, and the present invention may achieve the dual motor drive system using an inverter having phases or arms in M rows×N columns. A motor that can be driven by the inverter having phases or arms in M rows×N columns includes a N-phase motor having N pairs of M coils, and a N-phase motor having M pairs of N coils. Each coil may include a plurality of parallel-connected coils. The number of the teeth of each motor is as many as the number of phases of the motor multiplied by an integer.

Figure 11A:
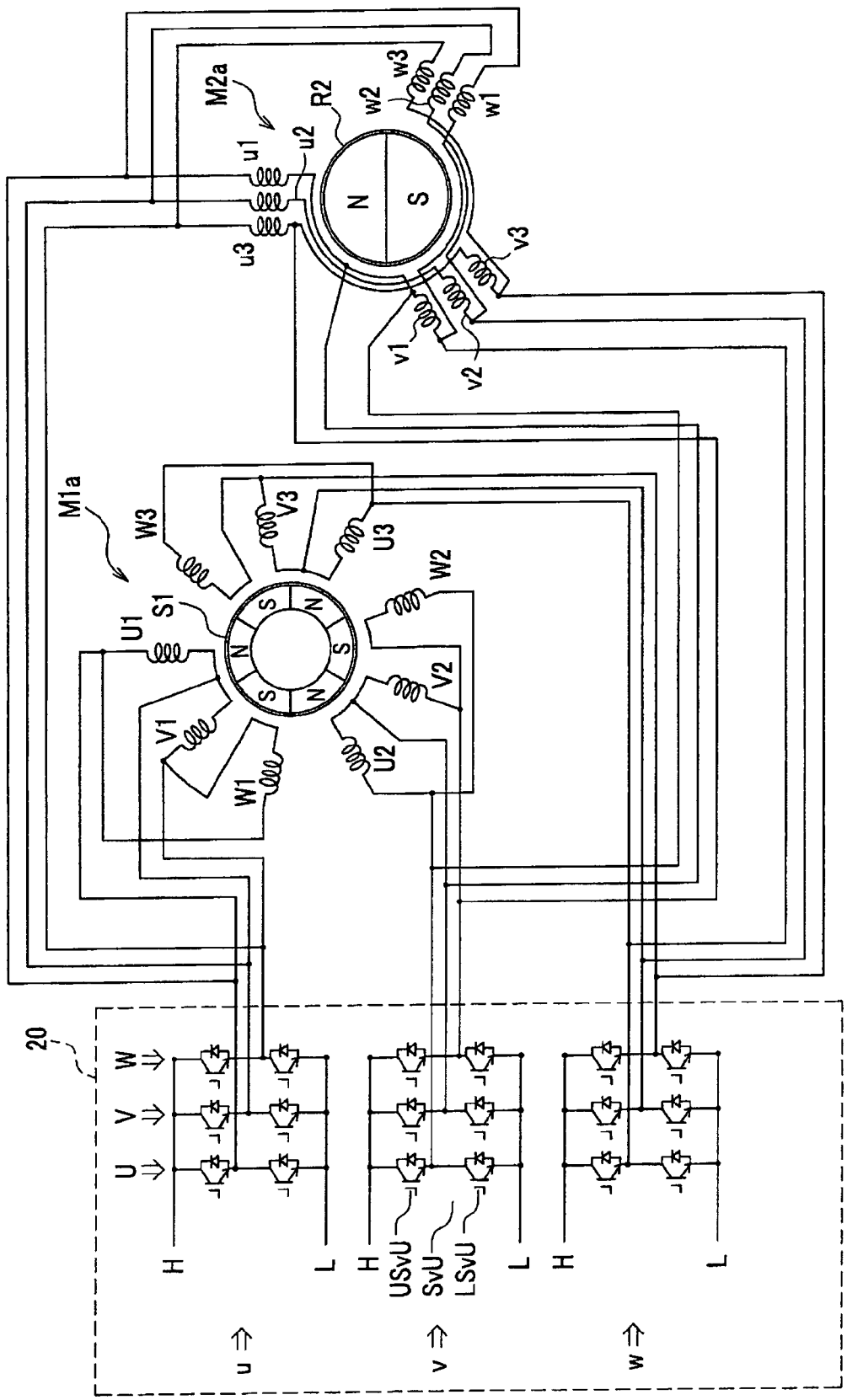
FIG. 11A is a circuit diagram of a configuration of a motor drive circuit that drives a motor M1a and a motor M2a, which have coils connected in a Δ-connection, according to a second example of the first embodiment of the present invention.
Figure 11B:
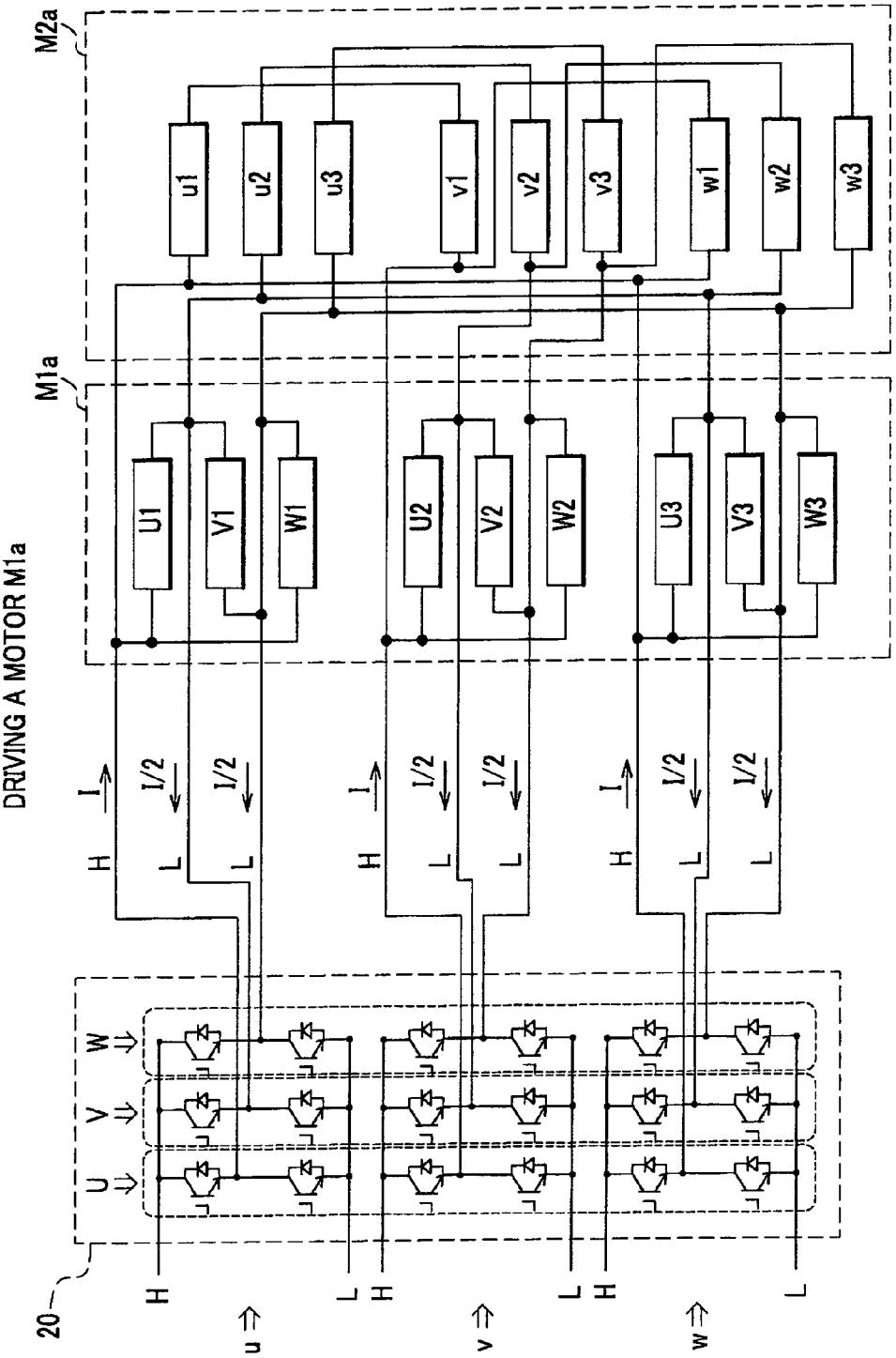
FIG. 11B illustrates controlling the inverter in the columns when driving the motor M1a of the motor drive circuit according to the second example of the first embodiment.

Although the motor has the coils in the Y-connection in the above description, a motor having coils in a Δ-connection may be used. FIG. 11A is a circuit diagram of a configuration of a motor drive circuit that drives a motor M1a and a motor M2a, which have coils connected in a Δ-connection, according to a second example of the first embodiment of the present invention. FIG. 11B illustrates controlling the inverter 20 in the columns when driving the motor M1a of the motor drive circuit according to the second example of the first embodiment. In FIGS. 11A and 11B, the arms of the inverter 20 are identified in the same manner as those in FIGS. 2 to 4. In the motor M1a, the groups of the coils denoted by 1, 2, 3, i.e., (U1, V1, W1), (U2, V2, W2), (U3, V3, W3) are connected in the Δ-connection, respectively. In the group of the coils U1, V1, W1, a node of the coil U1 and the coil W1 is connected to the arm SuU, a node of the coil U1 and the coil V1 is connected to the arm SuV, and a node of the coil V1 and the coil W1 is connected to the arm SuW. Similarly, in the group of the coils U2, V2, W2, each node of the coils U2, V2, W2 in the Δ-connection is connected to the arm in the row v of the inverter 20, and in the group of the coils U3, V3, W3, each node of the coils U3, V3, W3 in the Δ-connection is connected to the arm in the row w of the inverter 20. In the motor M2a, the groups of the coils denoted by 1, 2, 3, i.e., (u1, v1, w1), (u2, v2, w2), (u3, v3, w3) are connected in the Δ-connection, respectively. In the group of the coils u1, v1, w1, each node of the coils u1, v1, w1 in the Δ-connection is connected to the arm in the column U of the inverter 20, in the group of the coils u2, v2, w2, each node of the coils u2, v2, w2 in the Δ-connection is connected to the arm in the column V of the inverter 20, and in the group of the coils u3, v3, w3, each node of the coils u3, v3, w3 in the Δ-connection is connected to the arm in the column W of the inverter 20. Each of the above-described nodes is referred to as a drive point, because the node is a point to connect a power supply line with each of the coils in the Δ-connection. As for drive points of the motor M1 and the motor M2, which are connected in the Y-connection as shown in FIGS. 2 to 4, for example, drive points of the coil U1, V1, W1 are lead wires on the opposing side to the Y-connected wires of the coil U1, V1, W1.

As shown in FIG. 11B, when output voltages of the arms are the same in each of the columns U, V, W (the output voltages of the columns U, V, W are, in order, the high voltage H, the low voltage L and the low voltage L as shown in FIG. 11B) so as to drive the motor M1a and the motor M2a in the Δ-connection by the inverter 20, the same voltage is applied to each group of the three coils of the motor M2a. Thereby, it is possible to drive the motor M1a without passing a current through the motor M2a. Similarly, although not shown, when output voltages of the arms are the same in each of the rows u, v, w, the same voltage is applied to each group of the three coils of the motor M1a. Thereby, it is possible to drive the motor M2a without passing a current through the motor M1a. As described above, the present invention may be applied to the motor having the coils connected in the Δ-connection.

As described above, at least one motor having less than or equal to two pairs of magnetic poles is used according to the present invention. Generally, a motor having less than or equal to two pairs of magnetic poles, which has a simple configuration, is often used in a small-sized motor, and therefore the present invention is suitable for use in driving motors of accessories for an electric automobile.

The above description provides an example of the motor having the permanent magnet rotor arranged inside the stator, but the present invention may be applied to a motor having the reversed configuration, that is, the motor having a stator arranged inside a rotor.

In the above description, the inverter has a configuration in which the arms are arranged in a matrix. This, however, does not mean that the switches (arms) of the inverter are physically arranged in a grid, but it means that it is assumed that a connection relation between the inverter and the coils of the two motors connected with the inverter may be in a matrix, when considered based on the coils of the motors.

What is claimed is:
1. A dual motor drive system comprising:
   a first motor having N groups of M phase coils, the coils having M×N drive points;
   a second motor having M groups of N phase coils, the coils having N×M drive points;
   an inverter having M×N arms; and a control unit that controls the first motor and the second motor through the inverter, wherein at least one of the first motor and the second motor has as many teeth as the number of phases of the motor multiplied by an integer, and the M×N coils of the motor are wound around the teeth by equal to or more than two coils for each of the teeth, the M×N drive points of the first motor are connected to output points of the corresponding arms of the inverter, the N×M drive points of the second motor are connected to output points of the arms of the inverter, so that n phase coil (n=1, 2, ..., N) in each of the M groups of the second motor is connected to each of the N drive points of the first motor, the N drive points having the same phase, and the control unit feeds M×N pulse width modulation control signals to the inverter during a drive period of the first motor so that driving patterns of the phase coils are identical among all the N groups of the first motor, and the control unit feeds N×M pulse width modulation control signals to the inverter during a drive period of the second motor so that driving patterns of the phase coils are identical among all the M groups of the second motor.

2. The dual motor drive system according to claim 1, wherein at least one of the first motor and the second motor has less than or equal to two pairs of magnetic poles.

3. The dual motor drive system according to claim 1, wherein both the M and the N are 3.

4. The dual motor drive system according to claim 2, wherein both the M and the N are 3.

5. A control device for a dual motor drive system, the dual motor drive system including:

a first motor having N groups of M phase coils, the coils having M×N drive points;

a second motor having M groups of N phase coils, the coils having N×M drive points; and an inverter having M×N arms, at least one of the first motor and the second motor having as many teeth as the number of phases of the motor multiplied by an integer, the M×N coils of the motor being wound around the teeth by equal to or more than two coils for each of the teeth, the M×N drive points of the first motor being connected to output points of the corresponding arms of the inverter, the N×M drive points of the second motor being connected to output points of the arms of the inverter, so that n phase coil (n=1, 2, ..., N) in each of the M groups of the second motor is connected to each of the N drive points of the first motor, the N drive points having the same phase, the control device for the dual motor drive system for controlling the inverter, comprising:

a unit for feeding M×N pulse width modulation control signals to the inverter during a drive period of the first motor so that driving patterns of the phase coils are identical among all the N groups of the first motor, and for feeding N×M pulse width modulation control signals to the inverter during a drive period of the second motor so that driving patterns of the phase coils are identical among all the M groups of the second motor.

6. The control device for the dual motor drive system according to claim 5, the unit for feeding the pulse width modulation control signal comprising:

a unit that generates the M×N pulse width modulation control signals for the first motor based on a first command indicating a rotating speed and a torque each set for the first motor; and a unit that generates the N×M pulse width modulation control signals for the second motor based on a second command indicating a rotating speed and a torque each set for the second motor, wherein a rotating speed and a torque are set individually for each of the first motor and the second motor.

7. The control device for the dual motor drive system according to claim 5, further comprising:

a unit that controls the pulse width modulation control signal of one of the first and the second motors, the one to which a lower priority is previously set, so as to prevent a total amount of currents of the first and the second motors from exceeding an allowable current of the inverter.

8. The control device for the dual motor drive system according to claim 6, further comprising:

a unit that controls the pulse width modulation control signal of one of the first and the second motors, the one to which a lower priority is previously set, so as to prevent a total amount of currents of the first and the second motors from exceeding an allowable current of the inverter.

9. A motor to be used in a dual motor drive system, the dual motor drive system including:

a first motor having N groups of M phase coils, the coils having M×N drive points;

a second motor having M groups of N phase coils, the coils having N×M drive points;

an inverter having M×N arms; and a control unit that controls the first motor and the second motor through the inverter, the M×N drive points of the first motor being connected to output points of the corresponding arms of the inverter, the N×M drive points of the second motor being connected to output points of the arms of the inverter, so that n phase coil (n=1, 2, ..., N) in each of the M groups of the second motor is connected to each of the N drive points of the first motor, the N drive points having the same phase, the control unit feeding M×N pulse width modulation control signals to the inverter during a drive period of the first motor in accordance with a request from outside for the first motor so that driving patterns of the phase coils are identical among all the N groups of the first motor, and the control unit feeding N×M pulse width modulation control signals to the inverter during a drive period of the second motor in accordance with a request from outside for the second motor so that driving patterns of the phase coils are identical among all the M groups of the second motor, the motor to be used in the dual motor drive system as the second motor including:

as many teeth as the N multiplied by an integer, the M×N phase coils being wound around the teeth by equal to or more than two coils for each of the teeth.

10. The motor to be used in the dual motor drive system according to claim 9, wherein the motor has less than or equal to two pairs of magnetic poles.

11. The motor to be used in the dual motor drive system according to claim 9, wherein both the M and the N are 3.

12. The motor to be used in the dual motor drive system according to claim 10, wherein both the M and the N are 3.

13. The motor to be used in the dual motor drive system according to claim 11, the motor including:

a rotor having a pair of magnetic poles; and three teeth that produce a magnetic field for the rotor, each of the teeth having three coils wound therearound.

14. The motor to be used in the dual motor drive system according to claim 12, the motor including:

a rotor having a pair of magnetic poles; and three teeth that produce a magnetic field for the rotor, each of the teeth having three coils wound therearound.

15. The motor to be used in the dual motor drive system according to claim 11, the motor including:

a rotor having two pairs of magnetic poles; and six teeth that produce a magnetic field for the rotor, each of the teeth having three coils wound therearound, two of the teeth being opposed to each other and the individual coils of the opposing two teeth being connected in parallel.

16. The motor to be used in the dual motor drive system according to claim 12, the motor including:

a rotor having two pairs of magnetic poles; and six teeth that produce a magnetic field for the rotor, each of the teeth having three coils wound therearound, two of the teeth being opposed to each other and the individual coils of the opposing two teeth being connected in parallel.

* * * * *